United States Patent [19]

Sasaki et al.

[11] Patent Number: 5,044,526
[45] Date of Patent: Sep. 3, 1991

[54] FUEL PUMP AND RESERVOIR ARRANGEMENT FOR USE IN AN AUTOMOTIVE FUEL TANK

[75] Inventors: Michiaki Sasaki, Hadano; Katsunori Ozaki, Zama; Tsutomu Oshida, Yokohama; Shigeru Kimura, Yokohama; Takashi Umezawa, Yokohama; Kazuyuki Tomioka, Yokohama, all of Japan

[73] Assignees: Nissan Motor Co., Ltd.; NIFCO Inc., both of Yokohama, Japan

[21] Appl. No.: 446,524

[22] Filed: Dec. 7, 1989

[30] Foreign Application Priority Data

Dec. 7, 1988 [JP] Japan .................. 63-307780

[51] Int. Cl.⁵ .............................. F04B 17/00
[52] U.S. Cl. ..................... 222/377; 222/385; 417/360
[58] Field of Search ............... 222/372, 377, 385, 153; 417/360, 363; 248/224.3, 224.4, 225.1

[56] References Cited

U.S. PATENT DOCUMENTS

| 2,352,958 | 7/1944 | Lauer et al. | 222/385 X |
| 2,940,643 | 6/1960 | Olson | 222/385 X |
| 4,130,376 | 12/1978 | Dietsche | 417/360 X |
| 4,212,600 | 7/1980 | Otto et al. | 417/360 |
| 4,231,719 | 11/1980 | Ringwald et al. | 417/366 |
| 4,306,844 | 12/1981 | Otto et al. | 417/424 |
| 4,716,931 | 1/1988 | Shibamoto | 137/558 |
| 4,734,016 | 3/1988 | Sailer | 417/360 |
| 4,750,513 | 6/1988 | Griffin et al. | 137/316 |
| 4,768,925 | 9/1988 | Geupel | 417/363 X |

FOREIGN PATENT DOCUMENTS

| 3225929 | 1/1984 | Fed. Rep. of Germany . |
| 56-138718 | 1/1981 | Japan . |
| 63-4726 | 1/1988 | Japan . |

*Primary Examiner*—Michael S. Huppert
*Attorney, Agent, or Firm*—Foley & Lardner

[57] ABSTRACT

A reservoir in which fuel can be collected when only a small amount of fuel remains in the fuel tank, is arranged to support a fuel pump and to be connectable to the lower wall of the tank by a snap action type connector arrangement which is defined between a bracket fixed to the lower wall of the fuel tank and a portion of the reservoir which cooperates with the bracket. The reservoir containing the pump can be manually introduced into the interior of the fuel tank through an opening in the top thereof and maneuvered into engagement with the bracket. The center of gravity of the relatively heavy pump is arranged to be generally over the top of the bracket. When a predetermined strong force is applied to the reservoir in a predetermined manner it can disengage from the bracket.

11 Claims, 11 Drawing Sheets

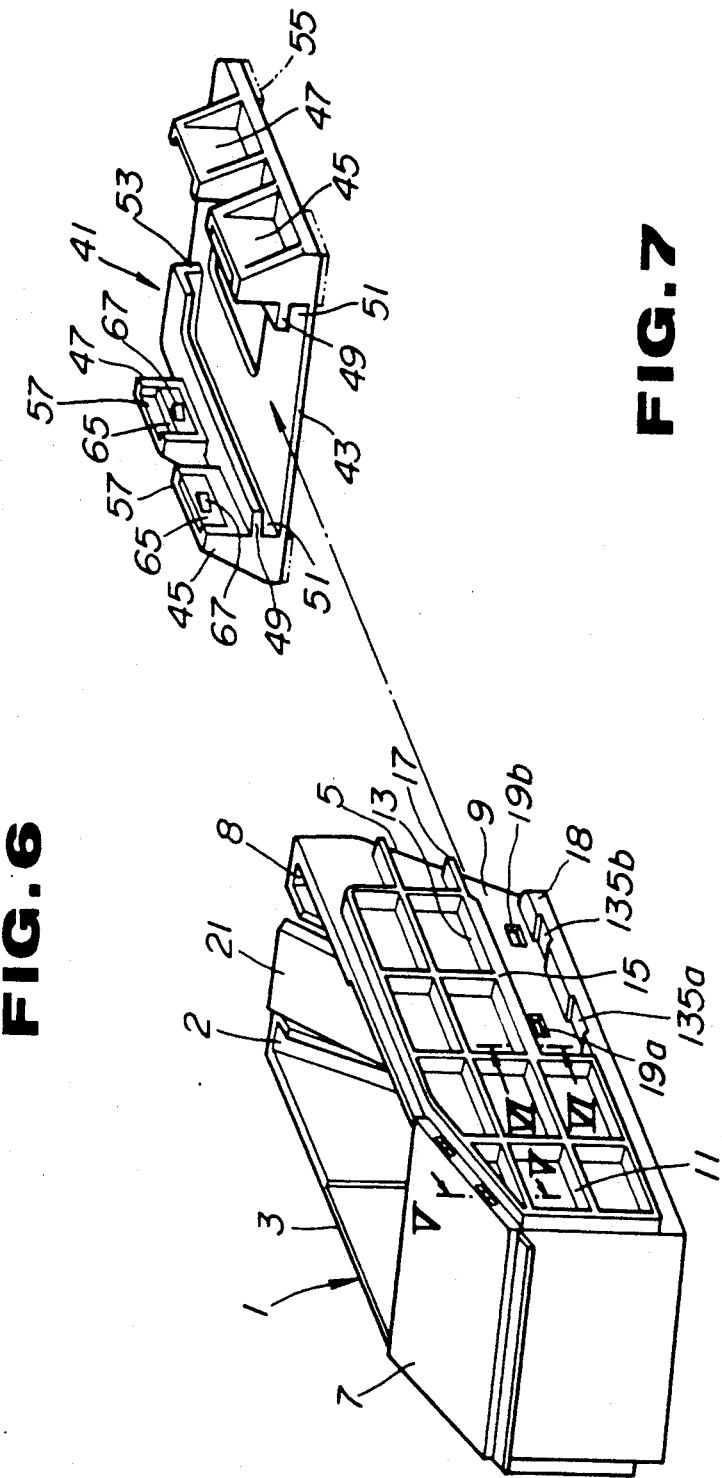
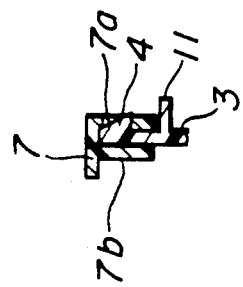
FIG. 6
FIG. 7

FUEL PUMP AND RESERVOIR ARRANGEMENT FOR USE IN AN AUTOMOTIVE FUEL TANK

BACKGROUND OF THE INVENTION

1. Field of the Invention

The present invention relates generally to an automotive fuel tank and more specifically to a mounting arrangement which facilitates disposal of a sub-reservoir /pump unit within the fuel tank.

2. Description of the Prior Art

FIGS. 1 and 2 show a prior art arrangement disclosed in JU.A.56.138718. In this arrangement a small cup-shaped collection vessel or reservoir 01 is fixedly connected to the lower surface or floor of the fuel tank 02 by means of rivets 03. An induction pipe 04 is arranged to extend through the fuel tank 02 and terminate proximate the bottom of the sub-reservoir 01.

A communication passage 05 is formed at about approximately half of the perimeter of the reservoir 01. One end of this passage 05 is arranged to communicate with the interior of the sub-reservoir 01 while the other end is arranged to communicate with the exterior thereof proximate the bottom of the fuel tank 02.

This arrangement is provided to ensure that sufficient fuel is available for starting the vehicle when only a small amount of fuel remains in the fuel tank 02 and/or the vehicle is parked on an inclined surface in a manner wherein the remaining amount of fuel tends to collect in one corner of the tank and thus induce conditions which would leave the end of the fuel induction pipe 04 unimmersed in the liquid fuel.

When the fuel level is low (lower than the top of the cup-shaped reservoir 01) the reservoir tends to become at least partially filled with liquid fuel due to splashing, sloshing and the like, during the running of the vehicle and/or by way of the communication passage 05. The reservoir 01 retains some fuel even when the vehicle is located on an inclined surface to the degree that the remaining fuel in the tank outside of the sub-reservoir 01 runs to one side or corner of the tank 02.

However, this arrangement has suffered from the drawback that as the vessel is secured in place by rivets 03 a load is concentrated on a relative small area of the fuel tank lower wall when the vehicle is parked on an incline and the like, and induces the problem that cracks and the like can be produced with the passing of time.

Further, in the event that a fuel pump unit (not shown) is disposed within the fuel tank and arranged to to supported by the reservoir, the mass of the pump unit acts at a predetermined distance from the rivets and thus is capable of generating a powerful moment which acts thereon. In the event of an accident, the torque generated tends to buckle the lower wall of the fuel tank and/or cause other damage of the nature which can bring about an extremely dangerous rupture of the vessel.

SUMMARY OF THE INVENTION

It is an object of the present invention to provide a mounting arrangement for a fuel pump and reservoir which enables the ready assembly and disposition of the pump and reservoir in the fuel tank, and the ready selective removal of the pump for inspection and the like.

It is another object of the invention to provide a mounting arrangement wherein the load incurred by the provision of the reservoir is distributed over a relatively large surface area of the fuel tank and thus attenuates the tendency for fatigue and the like to occur with the passing of time and accordingly enables a pump to be mounted on the reservoir It is a further object of the present invention to provide a mounting arrangement which permits the pump and reservoir unit to be released from its connection to the fuel tank wall in the case where a sudden large force is applied, and thus avoid the possibility of dangerous deformation of the fuel tank wall such as during vehicular collisions and the like.

It is a further object of the present invention to provide a mounting arrangement for a pump and reservoir unit which makes use of the fuel which is returned from the engine (e.g. fuel injection system) in a manner to produce a venturi like action which sucks fuel from the floor of the fuel tank and fills the reservoir.

In brief, the above objects are achieved by an arrangement wherein a relatively small reservoir in which fuel can be collected when only a small amount of fuel remains in the fuel tank, is arranged to support a fuel pump and to be connected to the lower wall of the tank by a snap action type connector arrangement which is defined between a bracket fixed to the lower wall of the fuel tank and a portion of the reservoir which cooperates with the bracket. The reservoir containing the pump can be manually introduced into the interior of the fuel tank through an opening in the top thereof and maneuvered into engagement with the bracket. The center of gravity of the relatively heavy pump is arranged to be generally situated over the top of the bracket. When a predetermined strong force is applied to the reservoir in a predetermined manner it can disengage from the bracket.

More specifically, a first aspect of the present invention is deemed to comprise a fuel tank which features: a bracket, the bracket being permanently secured to an inner surface of said fuel tank; a fuel pump; a fuel pump housing which encloses said fuel pump; a reservoir in which a portion of the fuel in said fuel tank can be collected when the level of fuel in the fuel tank is low, said reservoir having a structure which receives said fuel pump housing and supports said fuel pump housing in a predetermined position within said reservoir, said fuel pump housing have a latch arrangement which permits said fuel pump housing to be selectively removed from said reservoir; connection means for connecting said reservoir to said bracket, said connecting means being arranged to release said reservoir when a predetermined force is applied to said reservoir.

A second aspect of the present invention is deemed to comprise a mounting arrangement for mounting a reservoir within a fuel tank, the mounting arrangement featuring: a bracket, said bracket being fixed to a lower wall of said fuel tank, said bracket being made of the same material as said fuel tank and including a groove; a projection formed on the reservoir, said projection being receivable in said groove; clip means for producing an engagement between said bracket and said reservoir, said engagement preventing said projection from being withdrawn from said groove until a force of a predetermined magnitude and direction is applied to said reservoir, said reservoir having a center of gravity which is located essentially above said bracket.

A third aspect of the present invention is deemed to comprise a fuel tank which features: an opening formed in an upper portion of the fuel tank; a bracket fixed to a lower wall portion of the fuel tank; a reservoir for collecting fuel and from which fuel is pumped, said reservoir being secured in a predetermined position within said fuel tank by said bracket; means for maintaining the connection between said bracket and said reservoir until a predetermined force is applied to said reservoir; said opening and said bracket being arranged with respect to one another so that said reservoir can be introduced into said fuel tank through said opening and then easily maneuvered in a predetermined manner with respect to said bracket so that said connection means establishes said connection between said bracket and said reservoir.

BRIEF DESCRIPTION OF THE DRAWINGS

FIG. 6 is an exploded view showing the construction of the reservoir and a bracket which permits the reservoir to be detachably connected to a fuel tank wall;

FIG. 7 is a sectional view as taken along section line V—V of FIG. 6;

DETAILED DESCRIPTION OF THE PREFERRED EMBODIMENTS

Figure 1:
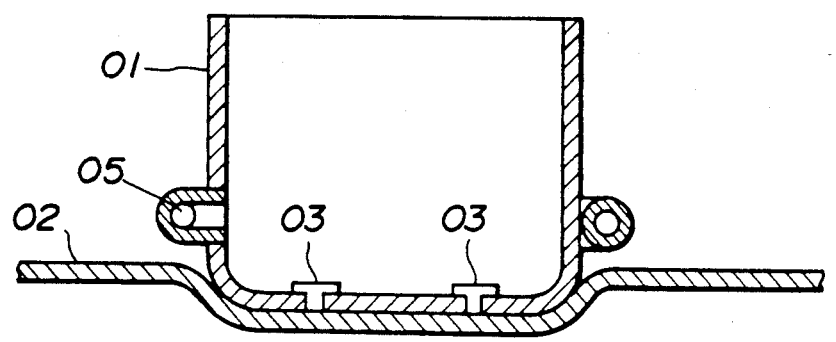
FIGS. 1 and 2 show the prior art arrangement discussed in the opening paragraphs of the instant disclosure.
Figure 2:
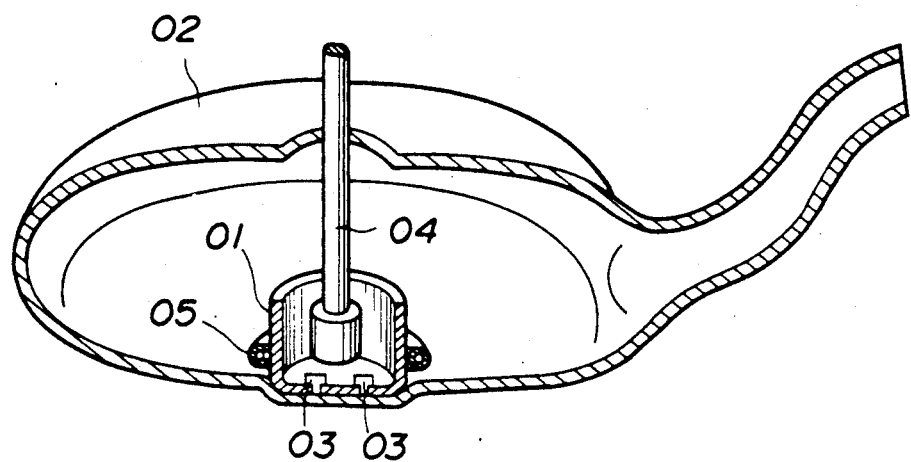
Figures 3, 5:
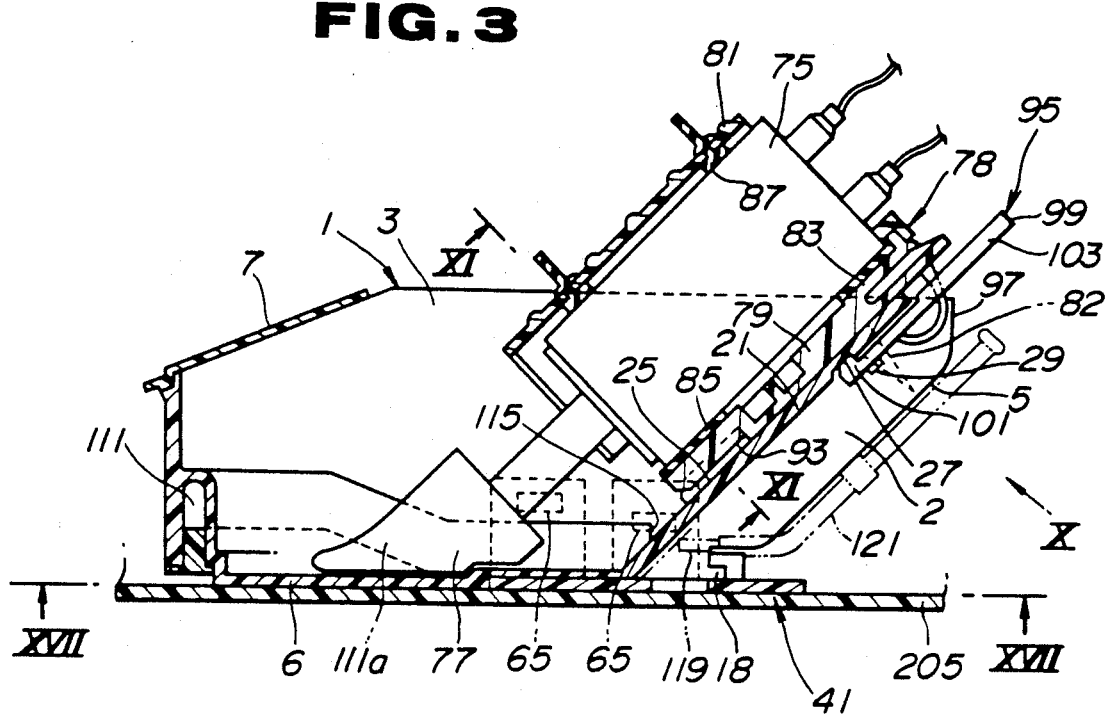
FIG. 3 is a sectional side elevation showing a pump unit and sub reservoir secured to the floor or lower wall of a fuel tank in accordance with a first embodiment of the present invention.
FIG. 5 is a schematic side sectional view showing the reservoir/pump unit mounted in place in a fuel tank.
Figure 4:
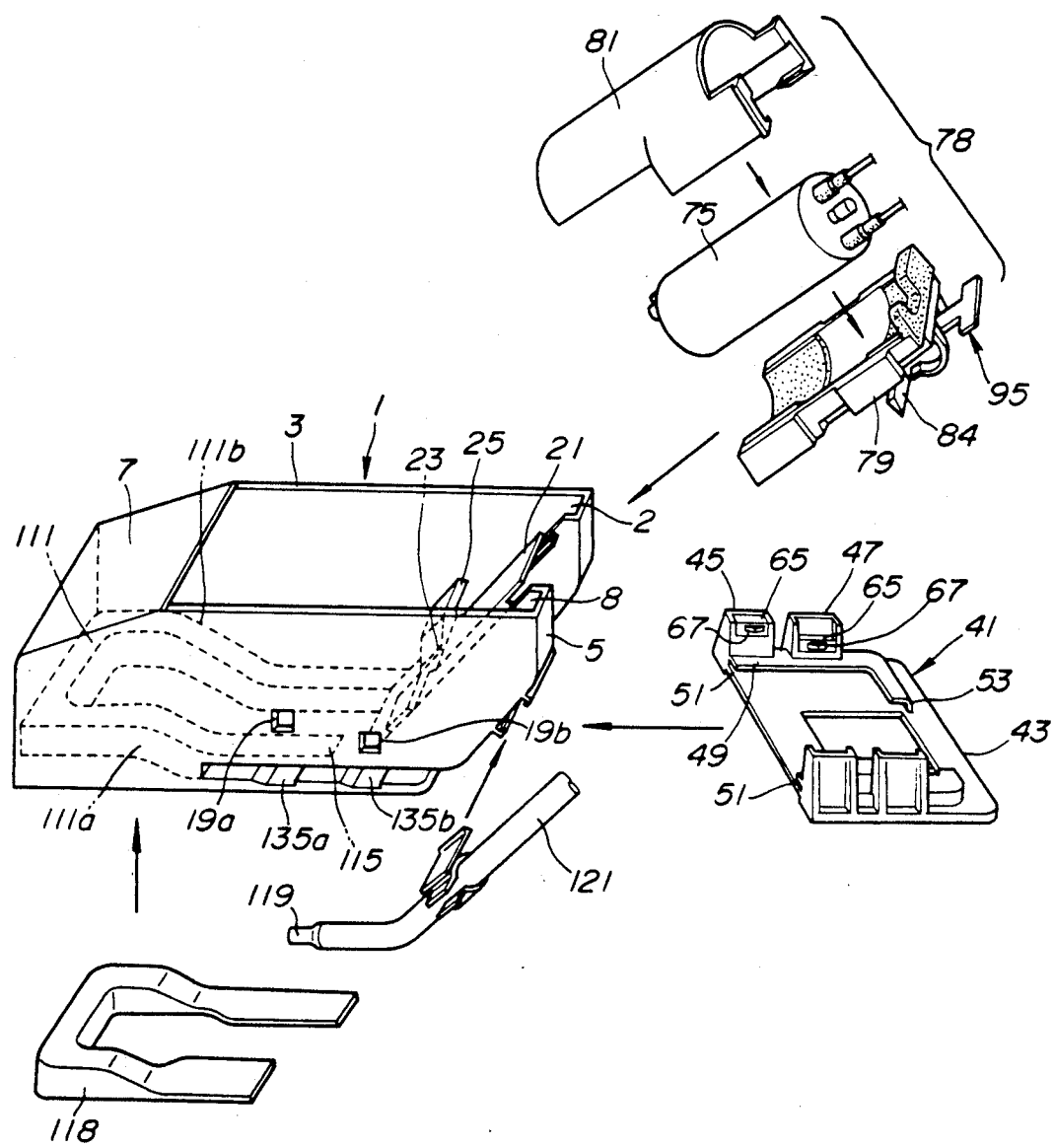
FIG. 4 is an exploded view showing the pump, pump housing, sub-reservoir, the bracket via which the reservoir is secured to the fuel tank wall, a fuel return pipe and an insert which forms part of a passage structure via which the fuel is inducted from the fuel tank and introduced into the interior of the reservoir.
Figure 8:
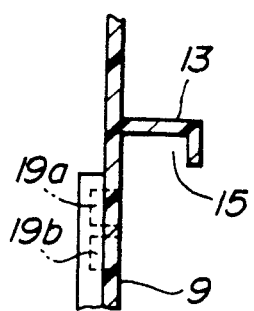
FIG. 8 is a sectional view as taken along section line VI—VI of FIG. 6.

FIGS. 3 to 5 show a first embodiment of the present invention. In this arrangement reservoir 1 made of a glass fiber re-enforced nylon is secured to the lower wall 205 of a fuel tank 203 by way of a bracket 41. In this arrangement the bracket 41 and the fuel tank 203 are preferably formed of the same material so as to facilitate connection.

An electric pump 75 is disposed in a rear portion of the reservoir 1. As best seen in FIG. 6 the reservoir 1 includes a main body 3. In this arrangement the main body 3 of the reservoir is formed with a rear wall 5 and a detachable cover 7. This cover 7 closes a relative open upper portion of the reservoir 1 and is provided to prevent a large amount of fuel from being lost from the reservoir in the event that the vehicle is subject to sudden deceleration or the like.

The cover 7 is secured to the main body 3 by way of the connection arrangement shown in section in FIG. 7. As will be appreciated, this structure enables a kind of labyrinth seal to be advantageously formed at the connection interface between the cover and the main body. Viz., the cover 7 is formed with two parallel flange members or ribs 7a, 7b which slide down along the inner and outer major sides of the wall portion of the main body on which the cover is fitted. The outer of the flanges are suitably apertured and arranged to receive locking barbs or pawls formed on the upper edge of the main body in the manner illustrated in FIG. 7. A horizontally extending re-enforcing rib 11 is arranged to proximate the lower edge of the outer flange 7a. This rib 11 increases the rigidity of the main body 3 and attenuates distortion and loss of shape due to immersion in different types of fuel. This rib 11 further acts as a baffle plate for attenuating the movement of the fuel surrounding the reservoir 1.

As shown in FIG. 6 connection surfaces 9 (only one is visible in this figure) are defined in the side of the main body and arranged to extend below a side rib 13. The trailing edge of this rib is formed with a reduced thickness guide portion 17. A flange 18 is provided which extends laterally from and along the lower side edge of the main body 3 and along the lower edge of the connection surface 9.

It should be noted that pump 75 is mounted so that the center of gravity of the pump is located approximately over the center of the bracket 41.

The bracket 41 is relatively small as compared with the main body 3 and as shown in FIG. 6, comprises a base plate 43 which has integrally formed wedge shaped crenellations 45, 47 which extend upwardly from each of two parallel sides. Each pair of crenellations 45, 47 support an inwardly extending flange 49 in the manner illustrated. The flanges 49 cooperate with the base plate 43 to define guide slots 51 which are designed to receive the flanges 18 formed on the main body 3. The side wall 49 includes an extension which extends across the end of the base plate to define an end wall 53. This wall acts as a stopper which limits the degree to which the flanges 18 can be inserted.

It should be noted that in this instance the base plate 43 is formed with four rectangular supports 55, with one at each corner. However, due to the pressure applied when connecting the base to the lower wall of the fuel tank, these supports are essentially compressed flat.

The crenellations 45, 47 are each formed with vertical dove tail groove 57 into which a clip 65, which is formed of a material such as nylon which exhibits adequate physical strength, is disposed in the illustrated manner. As clearly indicated in FIG. 9, the clips which are disposed in the crenellations 45 and 47 are arranged at different heights, i.e. are vertically staggered. In this instance, the clip in the forward crenellation 45 is arranged at a higher position than the one disposed in the rear crenellation 47. In order to ensure that the clips stay in these positions, the dove tail grooves 57 are arranged to have different lengths.

Figure 10:
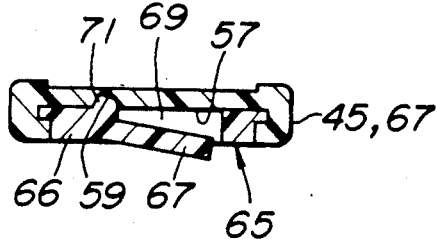
FIG. 10 is an enlarged sectional view showing one of the lock pawls illustrated in FIG. 6.

As best seen in FIG. 10 the clips 65 each have an essentially rectangular base member 66, the center portion of which is cut and arranged to act as a rearwardly extending pawl 67. A projection 71 is formed at the junction of the pawl 67 and the base member 66 which engages in a recess formed in a major wall of a dove tail groove 57 and biases the pawl outwardly to define a space 69. The base member is formed with a peripheral rib (no numeral) which is snugly received in the dove tail portion of the groove.

Figure 9:
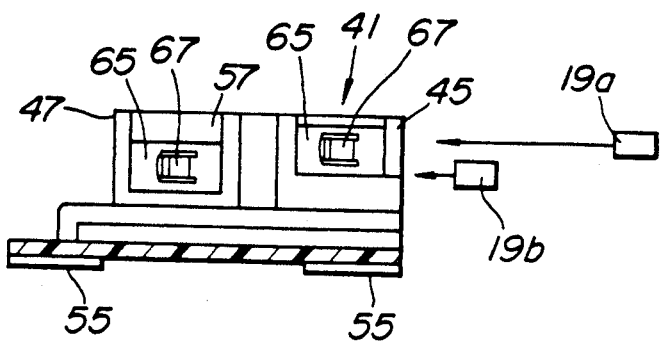
FIG. 9 is a side sectional view showing the locking pawl arrangement formed on the bracket in accordance with a first embodiment of the present invention and the manner in which the recesses formed on the sub-reservoir exterior are arranged to slide toward the pawls.

The main body 3 is formed with recesses 19a, and 19b in each of the connection surfaces 9. These recesses are, as shown in FIG. 9, arranged to align with one of the clips when the body 3 is inserted into place in the bracket 41. Of course, as the pawls 67 are oriented in the same direction as the body is inserted, they are deflected to flex inwardly into the spaces 69 via engagement with the connection surface 9 until such time as the appropriate recess overshadows the same. After this, the pawls 67 are arranged to spring or snap out into a locking position.

As will be appreciated, as the main body 3 is inserted into place the flange 18 slides into the guide slots 51 in a manner which prevents vertical movement of the body 3.

In the instant embodiment, the vertical staggering of the clips ensures that during assembly, the body will be completely inserted into place before the clips snap into place. It is not possible for an upper clip to lockingly engage a lower recess and thus the chance that the body may be left half inserted in the bracket is eliminated.

Figure 11:
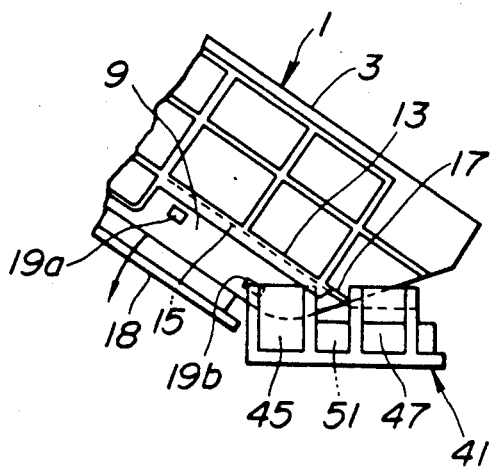
FIG. 11 is a side view showing the reservoir being moved into position at one end of the bracket prior to being to be slid into the locking position.

A further feature of the instant embodiment as shown in FIG. 11, is that the rear end of the reservoir is angled and the reduced thickness guide portion 17 of the side rib 13 is arranged so that when the main body (viz., the reservoir with the pump operatively mounted therein) is inserted into the interior of the fuel tank, via the opening 203a formed at the top of the fuel tank (see FIG. 5), and subsequently manually maneuvered until it is located over the forward portion of the bracket 41 with the body upwardly inclined in the illustrated manner, the guide portion 17 is engageable with the rear crenellations 47. From this position, by lowering the body in the direction indicated by the arrow in FIG. 11, the flange 18, which is formed along the lower edge of the main body 3, becomes aligned with the guide slots 51 and the body 3 can be readily slid into the bracket until it becomes locked in the appropriate position.

It should be noted at this point that it is possible to reverse the arrangement of the recesses and grooves and arrange for the clips to be disposed on the main body and for the recesses to be formed on the inboard faces of the crenellations 45, 47.

FIGS. 12 to 18 show the structure and arrangements via which the fuel pump 75 is disconnectably mounted on the main body.

A pump strainer 77 is supported on a pump housing 78. The pump housing 78 in this case comprises a base 79 having four recess 80 and a cover 81 which has four pawls 81a designed to engage in said recesses. The base and the cover are both made of a resilient material such as nylon. Cushion rubbers 83, and 85 are disposed between the pump and the base 79 while smaller rubber grommets are disposed through small bores formed in the cover 81 and arranged so that portions thereof are interposed between the pump 75 and the cover 81. These elastomeric (rubber) elements attenuate the vibration and/or rattling of the pump 75 and close off the numerous number of small openings defined about the periphery of the pump 75.

In addition to these elastomeric members, closure members 82 and 84 which take the form of elastomeric wedge-like members, are disposed on either side of the upper end of the base 79. These members are arranged to close off rectangular channels 2 and 8 (see FIGS. 4 and 6) which are defined along the sides of the rear wall 5 and through which fuel may slash or otherwise escape during vehicle operation.

Figure 12:
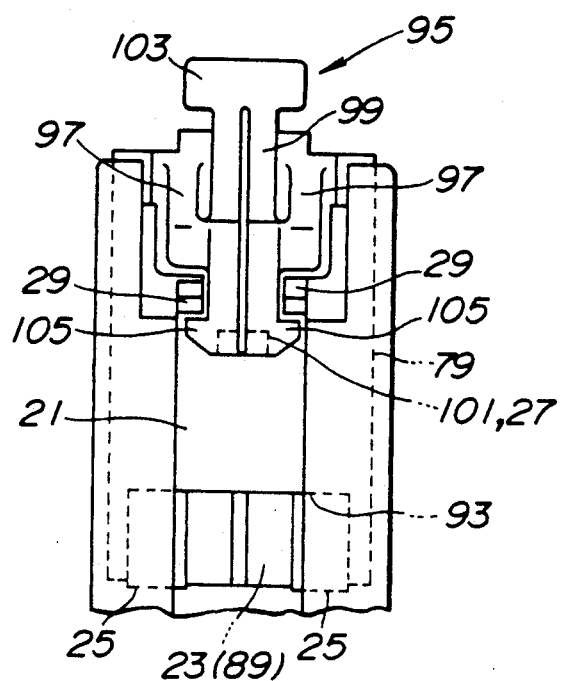
FIG. 12 is a plan view showing a manually operable lock arrangement which is provided on an upper portion of the fuel pump housing and the guides which are provided at the lower end thereof and slidably received in slots formed in the reservoir housing.
Figure 13:
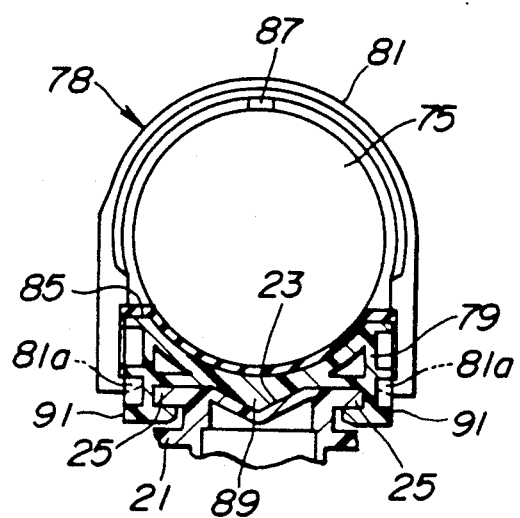
FIG. 13 is a partially sectioned end view which shows the pump housing engaged in an operative position with the reservoir.

A mounting plate 21 is formed integrally with the rear wall 5 and extends along between the channels 2 and 8. This wall serves to connect the pump housing base 79 to the main body 3. A shallow V-shaped guide groove 23 is formed near the bottom of the guide plate. Two gullwing-like projections 25 extend laterally from either side of the groove (see FIGS. 4 and 12). The base 79 is formed with a blunt V-shaped projection 89 which fits into the guide groove 23 and rail-like members 91 which are arranged to slidably engage the inboard faces of the wings as shown in FIG. 13. This construction defines a first connection arrangement by which the pump housing 78 is secured to the main body of the reservoir.

When the housing 78 is inserted into the main body 3 in a manner wherein the V-shaped projection 89 and the rail-like members 91 engage the wing like projections 25 in the manner illustrated in FIG. 13, the strainer 77 is disposed immediately adjacent to the floor 6 of the reservoir in the manner shown in FIG. 3.

Figure 14:
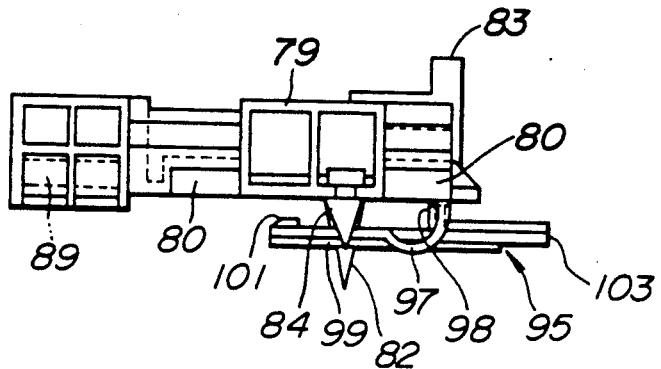
FIGS. 14 to 16 are views showing the lower half of the pump housing and illustrating the provision of elastomeric members which are used to close off openings and minimize the loss of fuel from the reservoir due to sloshing of the fuel within the reservoir.
Figure 15:
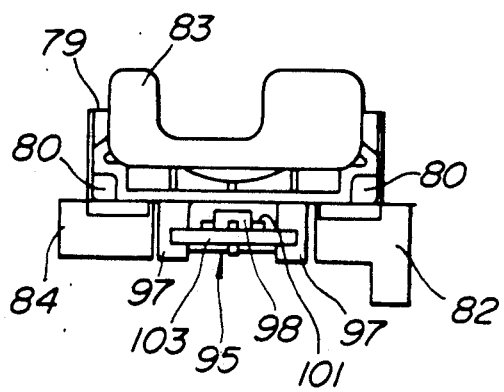
Figure 16:
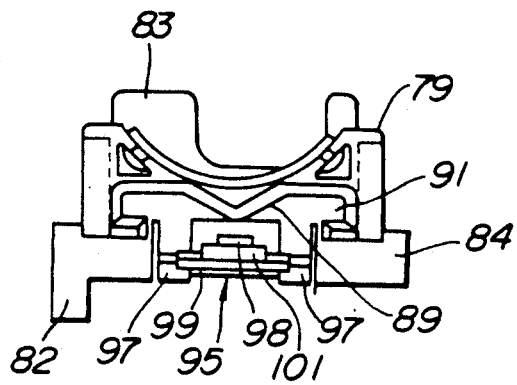
Figure 18:
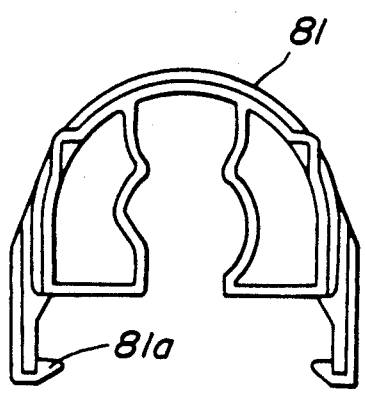
FIG. 17 and 18 are views showing the upper half of the pump housing.
Figure 17:
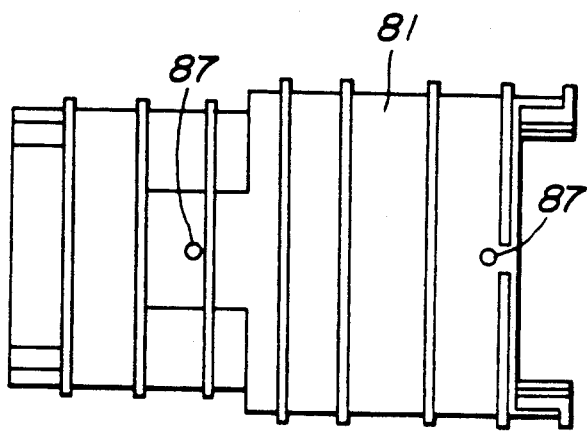

The upper end of the mounting plate 21 is arranged to cooperate with a manually operable arm 99 which is pivotally disposed at the upper end of the base 79 in a manner which defines a second connection arrangement. In this instance, the arm 99 is connected with the base 79 by way of a pair of flat springs 97 which extend along either side of the arm 99 from a location proximate the the mid-point thereof. As shown in FIG. 14, the springs have curved portions which blend into the main structure of the base 79.

The arm 99 is formed with a pawl 101 at the lower end thereof. This pawl is arranged to engage in a recess 27 formed in the rear side of the mounting plate 21. The upper end of the arm 99 is formed with a portion 103 which is adapted to be manually pressed or operated while the lower end thereof is also formed with a blunt spear-head like arrangement having laterally extending pairs of barbs 105. These barbs 105, as shown in FIG. 12, are arranged to be engageable with projections 29 which extend from the rear surface of the mounting plate 21. Although not clearly illustrated, these projections can be tapered portions which cooperate with the tapers on the forward edges of the barbs 105 to facilitate the lifting of the lower end of the arm during connection.

The arm 99 is formed with a projection 98 (see FIG. 14) which extends from the inboard side of the arm and projects toward the base 79. This projection limits the amount by which the arm 99 can be rotated in response to manual manipulation of the manually operable portion 103 and allows the locking arrangements provided at the lower end of the arm to be adequately released while preventing the arm from being excessively rotated in a manner which invites damage.

When the base plate is slid into place on the mounting wall, the blunt V-shaped projection moves into the shallow V-shaped groove and the rails 91 slide under the wing like projections. At the same time, the flat springs 97 bias arm 99 in a manner wherein which rotates the same and which to move the lower end of the arm toward the main structure of the base 79. After the blunt arrow like construction comprised of the barbs 105 has ridden up over the projections 29, the arm 99 is permitted to be rotated by the springs 97 in a manner which snaps the the pawl 101 into the recess 27 and produced a relatively large and audible clicking sound.

The generation of this sound is deemed advantageous in that it permits the operator who is assembling the unit to clearly understand that the pump housing has locked properly into place and reduces the chance of improper assembly.

As will be appreciated, as the mounting plate 21 is angled, when the pump housing is locked in place, the pump per se is held at an angle with respect to the main body 3 of the reservoir in a manner essentially as indicated in FIG. 3.

Accordingly, when the operator is manipulating the pump/reservoir into position within the fuel tank and orients the reservoir to the angle indicated in FIG. 11 prior to engagement with the bracket 41, the pump assumes an essentially horizontal orientation or attitude. As the pump has a mass which is relatively large as compared to the rest of the unit, the unit as a whole is rendered more easy to manipulate within the confines of the fuel tank since the mass tends to act at a location which is being held by the operator and thus produces a balance which attenuates the generation of moments and the like which would be apt to induce operator fatigue.

Figure 19:
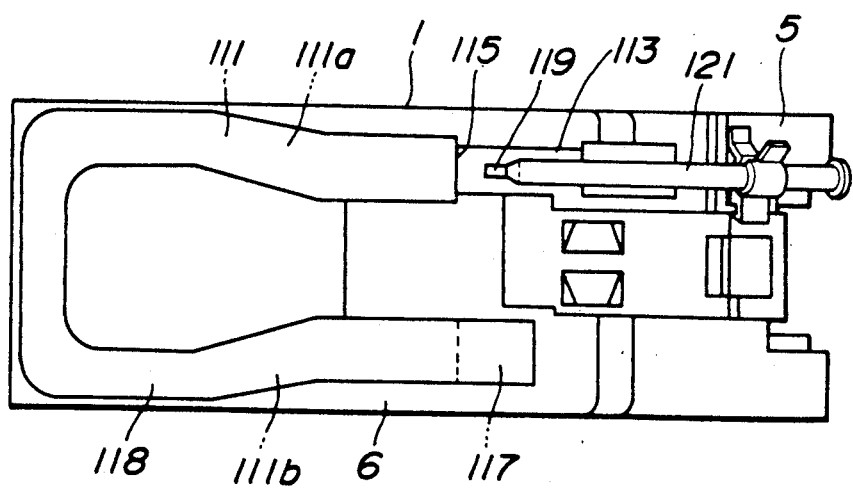
FIG. 19 is a plan view of the lower surface of the sub-reservoir depicting the disposition of the fuel return pipe and the insert which defines the induction passage arrangement.

As shown in FIGS. 4 and 19, a fuel induction passage structure 111 is defined in the lower wall or floor 6 of the main body 3. This passage structure is arranged to run from a location proximate to the lower left hand corner, rise up, extend across the front of the main body and then extend back down along the right hand side of the main body and terminate therewithin. More specifically, this passage structure is defined by a channel 113 which is formed in the lower surface of the main body. This channel is closed by an insert or chamber plate 118 in a manner to define an induction port 115, an upwardly inclined portion 111a on the left hand side of the main body and a downwardly inclined portion 111b on the right hand side. The passage terminates at an outlet 117 which opens into the interior of the reservoir.

A nozzle 119 which is formed at the end of a fuel return pipe 121 is secured to the rear wall 5 and oriented to inject the fuel returned from the engine into the induction port 115. As a result of this arrangement, the fuel which is injected into the passage structure 111 via the induction port 115 produces a venturi effect which inducts additional fuel from the fuel tank. The combination of the injection of the returned fuel and the induction provided by the venturi effect rapidly fills the reservoir 1 even when the level of fuel in the main portion of the fuel tank is extremely low.

As the passage structure includes a 'hill' defined by the inclined portions 111a and 111b, the all of fuel which is collected in the reservoir during the running of the vehicle is prevented from running back out through the passage 111. Additionally, when the vehicle in which the fuel tank is disposed is parked on the side of a hill or subject to a like type of inclination, a given amount of fuel is retained in the reservoir to ensure that the engine can be cranked and started without air being sucked into the fuel lines.

The above described reservoir and pump structure permits the vehicle to run until essentially all of the fuel in the fuel tank is exhausted.

Further, by setting the physical strength of the clip pawls 67 at the appropriate level, it is possible for the pump and reservoir unit to break out of the bracket when a predetermined force is applied in the direction of the guide slots. For example, by suitably orienting the clip within the fuel tank, in the case of a head on collision or the like type of accident, pawls 67 can be arranged to deform buckle or shear off, in response to the application of a predetermined force. This allows the pump to be released before the torque and like forces produced by sudden deceleration/acceleration of the same can have a detrimental effect on the lower wall of the fuel tank. Further, even in the released state it is still possible for the pump to induct fuel and pump it to the engine even though the function of the reservoir will more than likely be lost.

Further, in the case that lateral accelerations are applied to the pump, due to the large footprint of the bracket, the force which is applied to the lower wall of the fuel tank is spread out over a relatively large area and detrimental effects tend to be attenuated to acceptable levels.

A further merit of the above described embodiment comes in that the relatively heavy pump arrangement can be readily disposed through the opening 203a in the top of the fuel tank and disposed therewithin via a relatively simple apparatus which does not require troublesome operations such as insertion and tightening screw/bolts and the like. This permits the cost of the fuel tank to be reduced.

Figure 20:
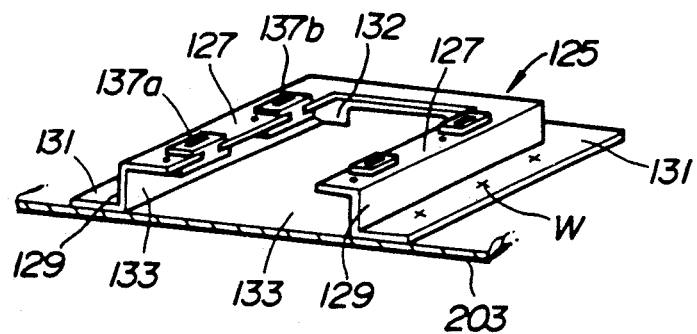
FIG. 20 is perspective view showing an alternative bracket via which the fuel pump/reservoir unit can be secured in place within the fuel tank.

FIG. 20 shows a bracket according to a second embodiment of the present invention. In this case the bracket 125 is made of metal and includes an essentially U-shaped upper flange 127; a lower flange 131; and vertical walls 127 and 133 which are integral with and connect the flanges 127 and 131. The fuel tank in this instance is also made of metal. The lower flange 131 is spot welded (W) to the lower wall of the fuel tank 203.

With this construction, the upper flange cooperates with the lower wall of the fuel tank to define a guide groove 133 into which the flange 18 formed along the lower side edges of the main body 3 can be inserted. A rear wall 132 which extends across the rear ends of the guide grooves 133 defines a stopper which limits the degree by which the flanges 18 can be inserted.

Figure 22:
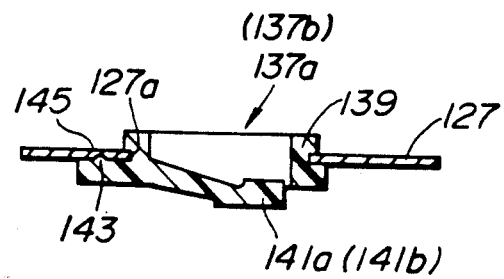
FIG. 22 is an enlarged sectional view showing the locking pawl arrangement which is provided on the bracket shown in FIG. 20.

In this instance the connection grooves 135a and 135b which are formed in the upper surface of the flanges (see FIGS. 4 and 6) are arranged to be used for locking the flange 18 within the bracket 125. As shown in FIG. 20, the upper flange is provided with clips 137a and 137b. The construction of these clips is shown in section in FIG. 22. As will be appreciated, each of the forward clips 137a comprises a grommet-like base 139 which is fitted into slot 127a formed in the upper flange 127. A pawl 141a extends from the base down into a guide groove 133. An extension 143 is arranged to engage the lower surface of the upper flange 127 and is provided with a projection 143 which extends into a small opening 145 formed in the flange. For obvious reasons the pawl is arranged to extend in the same direction as the flange 18 is inserted into the guide groove 133.

Figure 21:
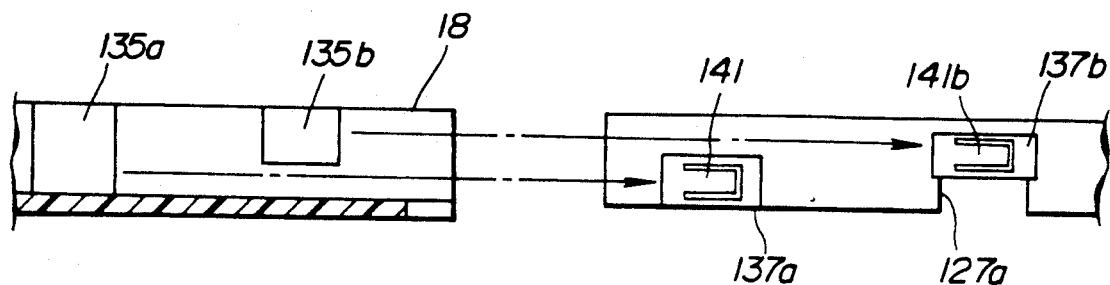
FIG. 21 is a view showing the manner in which the bracket and the corresponding portions of the reservoir body are arranged to be connected with one another.

In this instance the clips are staggered laterally. As shown in FIG. 21 the forward clips are arranged to be located further inboard than the rear ones. The connection grooves 135a are arranged to be longer than the grooves 135b and thus define an arrangement wherein the flanges 18 must be inserted completely into the guide grooves 133 before the clips will lock the same in place.

Figure 23:
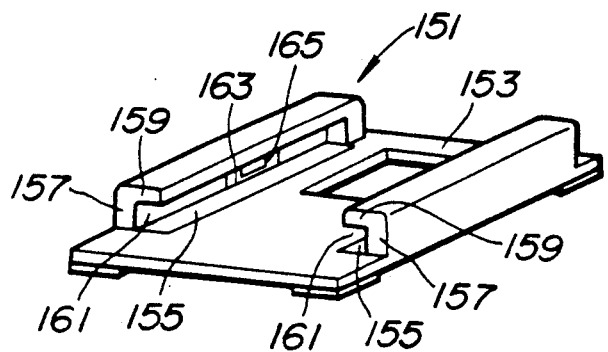
FIG. 23 is a perspective view showing a further bracket design variation.
Figure 24:
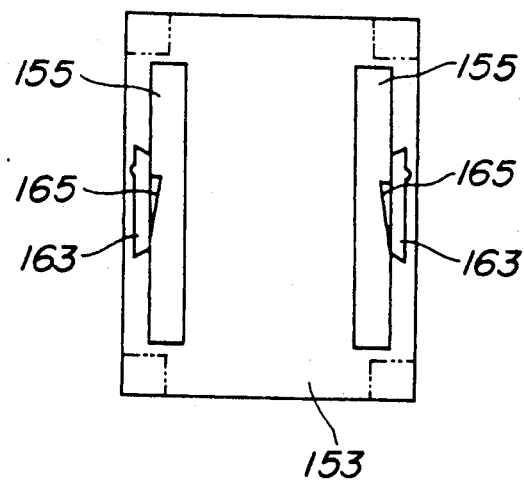
FIG. 24 is a plan view of the arrangement shown in FIG. 23.

FIGS. 23 and 24 show a bracket according to a third embodiment of the present invention. In this arrangement the bracket 151 comprises a base plate 153; side walls 157 which extend along either side of the base plate; inwardly extending flanges 159 which extend over the top of the base plate; and elongate shallow recesses formed in the upper surface of the base plate at locations directly beneath the flanges 159 to define guide grooves 155 therebetween. Guide grooves 161 are defined by the flanges 159. At the rear end of the base plate, the flanges curve and extend vertically to close off the ends of the guide grooves.

In this embodiment, only two clips are used. In this case the clips are disposed in suitable recesses formed in the sides of the side walls 157. In this arrangement the construction and arrangement of the clips can be essentially the same as those disclosed in connection with the first embodiment.

Figure 25:
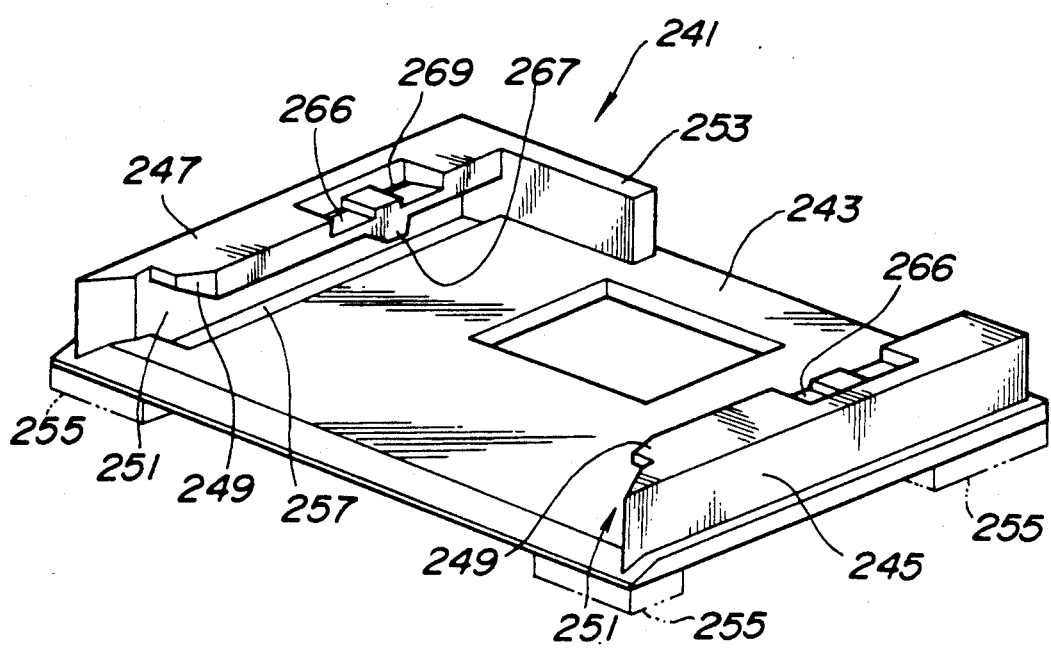
FIG. 25 is a perspective view showing a bracket according to a preferred embodiment of the present invention.
Figure 26:
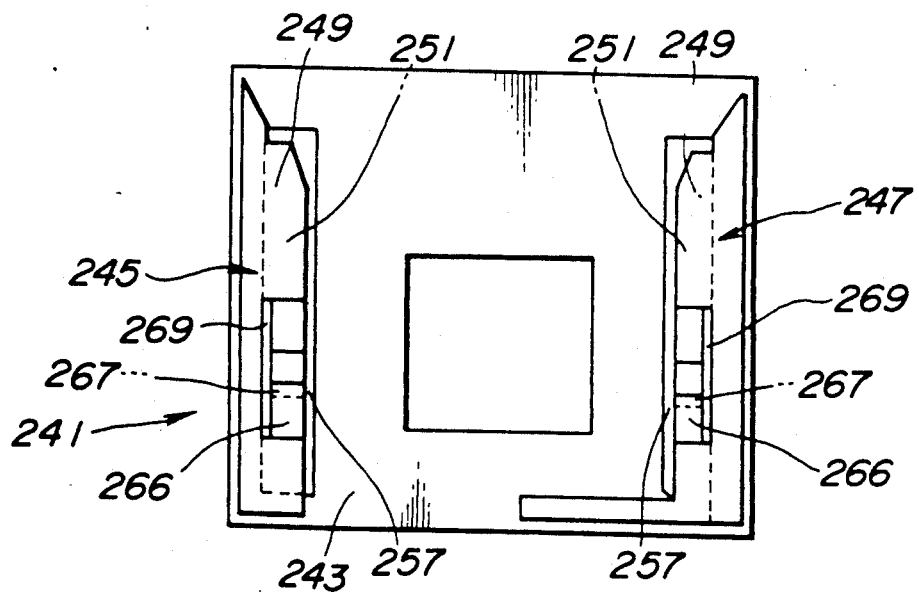
FIG. 26 is a plan view of the bracket shown in FIG. 25

FIGS. 25 and 26 show a bracket according to a preferred embodiment of the present invention. In this arrangement the bracket 241 comprises a base plate 243 which is similar in size to that used in the first embodiment. Side walls 245, 247 are provided along each side of the base plate. Inwardly extending flanges 249 are formed along the tops of the walls. These walls cooperate with the base plate to define guide grooves 251 into which the flanges 18 can be inserted. An end wall 253 is arranged to extend from one of the side walls across the end of the left hand guide groove 251 to act as a limit.

Small rectangular supports 255 (illustrated in two dot phantom) are formed at the four corners of the base plate 243 in a manner similar to the first embodiment. These supports 255 are compressed flat when the base plate is affixed to the floor of the fuel tank.

Shallow elongate recesses 257 are formed in the upper surface of the base plate 243 at locations directly below the flanges 249.

Pawls 267 are formed integrally on the lower faces of the flanges 247. These are arranged to engage in the grooves 135a formed in the upper surfaces of the flanges 18. The forward faces of the pawls 267 are tapered to facilitate insertion of the flanges 18 into the guide grooves 251. The upper surfaces of the flanges 247 are recessed to provide an arrangement wherein the pawls 267 are supported on web like portions having a thickness less than that of the flanges 249. Stopper projections (no numeral) are defined on the upper side of the web directly over the top of the pawls 267. These portions are provided to limit the amount of flexure that the webs may undergo. As will be appreciated from FIG. 26, the webs are formed in a manner wherein a narrow clearance 269 is defined between the vertical wall portions of the recesses and the edges of the webs which proximate the same.

The forward ends of the side walls 245 and 247 and the flanges 249 are tapered as shown in FIG. 25 to facilitate the initial location of the flanges 18 in the mouths of the guide grooves 251.

It should be noted that with this embodiment it is desirable to arrange the location of the clip pawls so that the center of gravity of the pump is located over the top of the same.

Experimental data has shown that the above mentioned preferred bracket embodiment provides the most reliable release of the reservoir/pump unit when subject to severe vehicular impacts.

What is claimed is:

1. In a fuel tank
    a bracket, said bracket being permanently secured to an inner surface of said fuel tank;
    a fuel pump;
    a fuel pump housing which encloses said fuel pump;
    a reservoir in which a portion of the fuel in said fuel tank can be collected, said reservoir having a structure which receives said fuel pump housing and supports said fuel pump housing in a predetermined position within said reservoir, said fuel pump housing having a latch arrangement which permits said fuel pump housing to be selectively removed from said reservoir;
    connection means for connecting said reservoir to said bracket, said connecting means being arranged to release said reservoir when a predetermined force is applied to said reservoir.

2. A fuel tank as claimed in claim 1 wherein said bracket is formed of the same material as the fuel tank.

3. A fuel tank as claimed in claim 1 wherein said fuel pump housing is connected to said reservoir at first and second locations, one of said first and second locations including said latch arrangement.

4. A fuel tank as claimed in claim 1 wherein said pump has a given mass and is disposed in said reservoir so that the center of gravity of the pump is located over an essentially central portion of said bracket.

5. A fuel tank as claimed in claim 1 wherein said connection means comprises:
    means defining a guide groove in said bracket into which a portion of said reservoir is slidably receivable;
    a clip, said clip being arranged on one of said reservoir and said bracket, said clip being arranged to engage a portion of the other of said reservoir and said bracket, said clip being arranged to produce an engagement between said reservoir and said bracket which locks said reservoir in a predetermined position with respect to said reservoir, said clip being arranged to release the engagement when said redetermined force is applied to said reservoir in a direction which tends to slide said portion of said reservoir which is slidably received in said guide groove, out of said guide groove.

6. A mounting arrangement for mounting a reservoir within a fuel tank, comprising:
   a bracket, said bracket being fixed to a lower wall of said fuel tank, said bracket being made of the same material as said fuel tank and including a groove;
   a projection formed on the reservoir, said projection being receivable in said groove;
   clip means for producing an engagement between said bracket and said reservoir, said engagement preventing said projection from being withdrawn from said groove until a force of a predetermined magnitude and direction is applied to said reservoir, said reservoir having a center of gravity which is located essentially above said bracket.

7. A mounting arrangement as claimed in claim 6, further comprising a pump, said pump being releasably mounted in said reservoir, said pump being disposed in said reservoir so that said center of gravity is located essentially over said bracket.

8. A fuel tank comprising:
   an opening formed in an upper portion of the fuel tank;
   a bracket fixed to a lower wall portion of the fuel tank;
   a reservoir for collecting fuel and from which fuel is pumped, said reservoir being secured in a predetermined position within said fuel tank by said bracket;
   means for maintaining the connection between said bracket and said reservoir until a predetermined force is applied to said reservoir;
   said opening and said bracket being arranged with respect to one another so that said reservoir can be introduced into said fuel tank through said opening and then maneuvered in a predetermined manner with respect to said bracket so that said connection means establishes said connection between said bracket and said reservoir.

9. A fuel tank as claimed in claim 8 further comprising passage means in said reservoir for introducing fuel from said fuel tank into said reservoir, said passage means having an inlet which is located proximate the bottom of the fuel tank, said passage means being so constructed and arranged that fuel introduced into said reservoir through said passage means tends to be prevented from draining out of said reservoir therethrough.

10. A fuel tank as claimed in claim 9 wherein said passage means includes venturi means for inducting fuel from said fuel tank and causing it to flow through said passage means and collect in said reservoir.

11. A fuel tank as claimed in claim 8 wherein said reservoir comprises a mounting wall, said mounting wall being arranged to support a pump housing in which a pump is disposed, said mounting wall having a projection on a first side thereof, the pump housing having a recess which receives said projection, the projection and the recess defining a first connection between the reservoir and the pump housing, the pump housing being disposed against the first side and having an arm which engages a second side of the connection wall, the arm being pivotal so as to permit the engagement with the second side to be selectively releasable, the arm defining a second connection between the pump housing said the reservoir.

* * * * *